(12) United States Patent
Javice et al.

(10) Patent No.: US 10,319,126 B2
(45) Date of Patent: Jun. 11, 2019

(54) RIBBON TO QUICK ACCESS TOOLBAR ICON CONVERSION

(71) Applicant: Microsoft Technology Licensing, LLC, Redmond, WA (US)

(72) Inventors: Elie Samuel Javice, Seattle, WA (US); Navneet Singh Kambo, Redmond, WA (US); Han-Yi Shaw, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 59 days.

(21) Appl. No.: 15/238,542

(22) Filed: Aug. 16, 2016

(65) Prior Publication Data

US 2018/0053325 A1 Feb. 22, 2018

(51) Int. Cl.
*G06T 11/60* (2006.01)
*G06F 3/0481* (2013.01)

(52) U.S. Cl.
CPC .......... *G06T 11/60* (2013.01); *G06F 3/04817* (2013.01); *G06T 2200/24* (2013.01)

(58) Field of Classification Search
CPC ... G06T 11/001; G06T 11/60; G06T 2200/24; G06F 3/04817
See application file for complete search history.

(56) References Cited

U.S. PATENT DOCUMENTS 6,466,210 B1 * 10/2002 Carlsen ................... G06T 11/60
345/629
8,139,075 B2 3/2012 Cohen et al.
9,218,680 B2 12/2015 Kurzweil et al.
9,251,762 B2 2/2016 Johnson, III et al.
2006/0251322 A1* 11/2006 Palum .................... H04N 9/646
382/167
2011/0041092 A1 2/2011 Zhang
2011/0043535 A1 2/2011 Kwiatkowski et al.
2012/0041570 A1 2/2012 Jones et al.
2012/0165071 A1* 6/2012 Hsu ....................... G06F 1/1632
455/557

(Continued)

FOREIGN PATENT DOCUMENTS

CA 2772781 A1 9/2012

OTHER PUBLICATIONS

Evening (Martin Evening, "Adobe Photoshop CS3 for Photographers", Elsevier Ltd., Amsterdam, 2007).*

(Continued)

*Primary Examiner* — William A Beutel

(57) ABSTRACT

Aspects of the present disclosure relate to systems and methods for converting a color icon into a glyph. In one aspect, a color icon associated with an application may be identified. The color icon may be converted to a dilated icon using a dilation function. A color edge only icon may be created using the color icon and the dilated icon. The color edge only icon may be converted to a gray edge only icon. An intensity of the gray edge only icon may be reduced to create a clipping edge only icon. The color icon may be converted to an alpha channel icon using an alpha channel. A dark glyph may be created using the clipping edge only icon and the alpha channel icon. A final glyph may be created by clipping an alpha value from and adding a constant value to the dark glyph.

20 Claims, 5 Drawing Sheets

(3 of 5 Drawing Sheet(s) Filed in Color)

(56) References Cited

U.S. PATENT DOCUMENTS

2014/0201672 A1  7/2014  Borzello et al.
2015/0113445 A1  4/2015  Breger et al.

OTHER PUBLICATIONS

Maini et al. (Raman Maini and Himanshu Aggarwal, "A Comprehensive Review of Image Enhancement Techniques", Journal of Computing, vol. 2, Issue 3, Mar. 2010, ISSN 2151-9617).*
"Snagit", Published on: May 2010 Available at: http://download.techsmith.com/snagit/docs/onlinehelp/enu/10/Snagit-10-Help.pdf
"Ribbon tips for visually appealing Office applications", Retrieved on: Jun. 15, 2016 Available at: http://www.spreadsheet1.com/ribbon-user-interface-design-pitfalls.html
"Office 2013 Ribbon Look and Feel", Published on: Oct. 11, 2014 Available at: http://help.infragistics.com/Help/Doc/WinForms/2013.2/CLR4.0/html/WinToolbarsManager_Office_2013_Ribbon_Look_and_Feel.html#_Ref36193225.
Harris, Jensen., "RibbonX Image FAQ", Published on: Nov. 27, 2006 Available at: https://blogs.msdn.microsoft.com/jensenh/2006/11/27/ribbonx-image-faq/.
"Save selections and alpha channel masks", Published on: Jun. 20, 2014 Available at: https://helpx.adobe.com/photoshop/using/saving-selections-alpha-channel-masks.html.

* cited by examiner

RIBBON TO QUICK ACCESS TOOLBAR ICON CONVERSION

BACKGROUND

Icons within applications such as word processing applications may be used for performing a function associated with the application and/or a file of the application. For example, an icon for performing a paste function within the file may be located within a ribbon of the file, for example. The icons within the applications may be colorful, glow, and have shadows making it difficult to convert to a glyph, for example. Current techniques for converting a colorful icon to a glyph may result in a loss of fidelity of the icons. Furthermore, a user may desire to work within a file and/or application without viewing the ribbon (e.g., where the icons are located in some cases). In this regard, current techniques for providing functional icons in a convenient location and/or converting colorful icons to glyphs are inefficient and inadequate.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In summary, the disclosure generally relates to systems and methods for converting a color icon into a final glyph. In one aspect, a color icon associated with an application may be identified. The color icon may be converted to a dilated icon using a dilation function. A color edge only icon may be created using the color icon and the dilated icon. The color edge only icon may be converted to a gray edge only icon. An intensity of the gray edge only icon may be reduced to create a clipping edge only icon. The color icon may be converted to an alpha channel icon using an alpha channel. A dark glyph may be created using the clipping edge only icon and the alpha channel icon. The dark glyph may be inverted to create a light glyph. A final glyph may be created by clipping one or more alpha values from the light glyph and adding a constant value to the light glyph.

In another aspect, a method for icon edge detection is presented. In one aspect, a color icon associated with an application may be identified. The color icon may be converted to a dilated icon using a dilation function. A color edge only icon may be created using the color icon and the dilated icon. The color edge only icon may be converted to a gray edge only icon. An intensity of the gray edge only icon may be reduced to create a clipping edge only icon. The color icon may be converted to an alpha channel icon using an alpha channel. A dark glyph may be created using the clipping edge only icon and the alpha channel icon. A first mode final glyph may be created by clipping an alpha value from and adding a constant value to the dark glyph.

In further aspects, an application may comprise a file in a user interface for displaying a plurality of color icons and a plurality of final glyphs, a ribbon within the file in the user interface through which to display the plurality of color icons, and a quick access toolbar within the file in the user interface through which to, in response to converting the plurality of color icons into the plurality of final glyphs, display the plurality of final glyphs.

DESCRIPTION OF THE DRAWINGS

The patent or application file contains at least one drawing executed in color. Copies of this patent or patent application publication with color drawing(s) will be provided by the Office upon request and payment of the necessary fee.

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Figure 1:
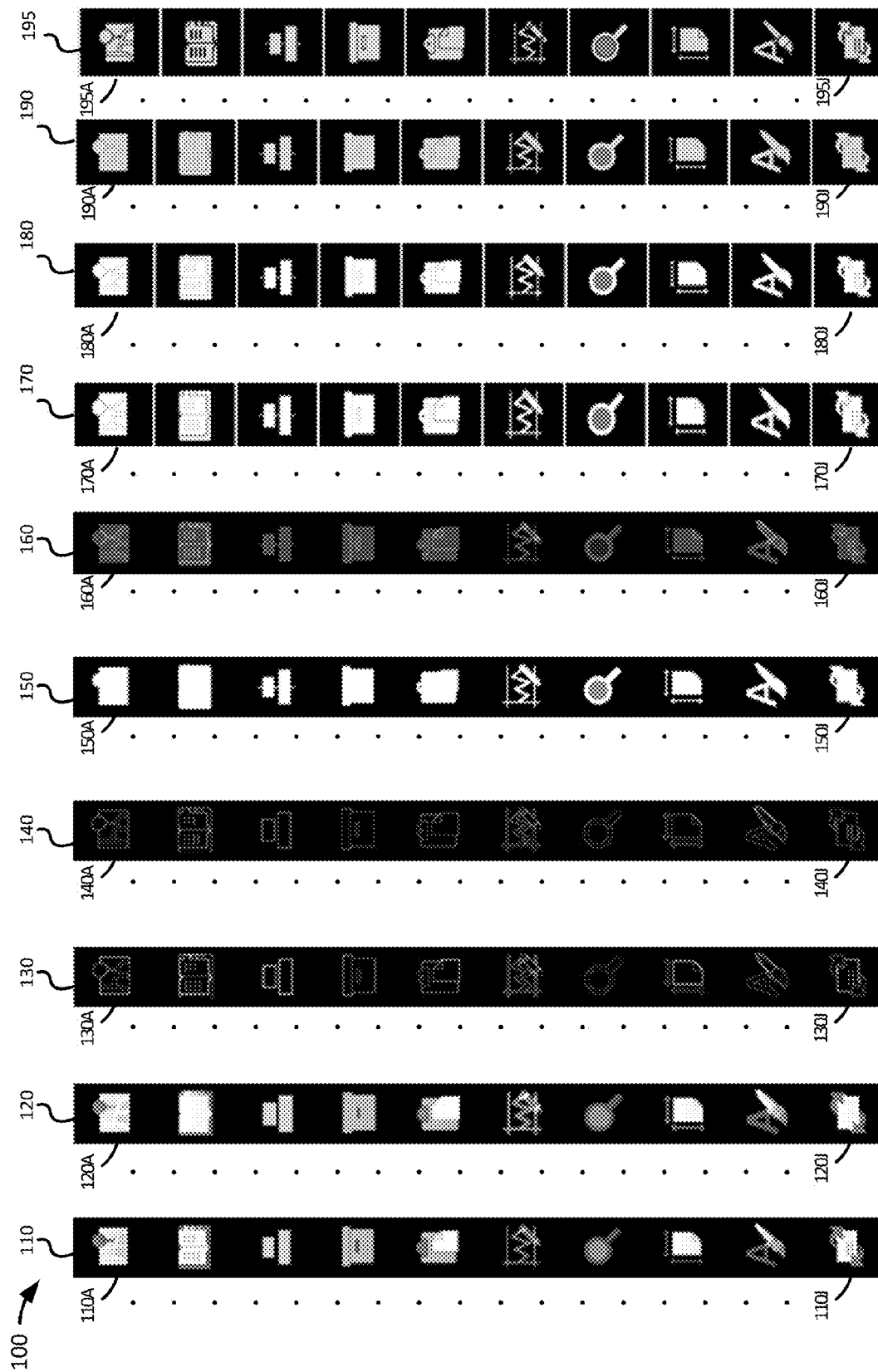
FIG. 1 illustrates one view of a plurality of icons at various stages while applying a multi-step icon conversion process, according to an example aspect.

Aspects of the disclosure are generally directed to providing a system for converting color icons into glyphs. For example, applications such as word processing applications, spreadsheet applications, and electronic slide presentation applications, to name a few, may include color icons in a ribbon portion of the application. In some cases, the color icons located in the ribbon portion of the application may be functional icons. For example, in response to receiving a selection of a color icon, a function associated with the application may be performed. In examples, the ribbon may include color icons that are located in the ribbon by default by the application. In this regard, a quick access toolbar may be provided within the application for customization of the color icons located in the ribbon. For example, a user of the application may customize the quick access toolbar to include icons that a user may quickly access. In one example, the quick access toolbar may include icons that are smaller in size than the color icons located in the ribbon. In this regard, the icons located in the quick access toolbar may be scaled to the size of the quick access toolbar. In another example, the quick access toolbar may have a different background color than the ribbon. In order to scale the color icons and maintain clearness, sharpness, fidelity, and key features of the color icons when displayed on a different background color, the color icons in the ribbon may be converted to white glyphs for display within the quick access toolbar while maintaining clearness, sharpness, fidelity, and key features of the color icons.

As discussed above, the icons within applications (e.g., located in the ribbon) may be colorful, glow, and have shadows making it difficult to convert to a glyph, for example. Current techniques for converting a colorful icon to a glyph may result in a loss of fidelity of the icons. Furthermore, a user may desire to work within a file and/or application without viewing the ribbon (e.g., where the icons are located in some cases). In this regard, current techniques for providing functional icons in a convenient location and/or converting colorful icons to glyphs are inefficient and inadequate.

Accordingly, aspects described herein include providing icon edge detection for converting color icons into glyphs.

In this regard, a multi-step icon conversion may be applied to one or more color icons associated with an application. In one example, the first step of the color icon conversion process may include identifying a color icon associated with an application. For example, a color icon located in the ribbon may be identified for displaying within the quick access toolbar of the application. In another example, the second step of the icon conversion process may include converting the color icon to a dilated icon using a dilation function. For example, the dilation function may generally expand each bright pixel in the color icon into the shape of a kernel, flipped horizontally and vertically. In another example, the third step of the icon conversion process may include creating a color edge only icon using the color icon and the dilated icon. For example, the color icon may be subtracted from the dilated icon to create the color edge only icon. In another example, the fourth step of the icon conversion process may include converting the color edge only icon to a gray edge only icon. For example, an averaging function may be applied to the color edge only icon to convert it to a gray edge only icon.

In another example, after the fourth step of the icon conversion process and before the fifth step of the icon conversion process an intensity of the gray edge only icon may be reduced to create a clipping edge only icon. For example, reducing the intensity of the gray edge only icon may reduce an edge darkness of the gray edge only icon. In another example, the fifth step of the icon conversion process may include converting the color icon to an alpha channel icon using an alpha channel. For example, an alpha value of each pixel of the color icon may be kept and a red, green, blue (RGB) value of each pixel of the color icon may be set to a constant value. In another example, the sixth step of the icon conversion process may include creating a dark glyph using the clipping edge only icon and the alpha channel icon. For example, one or more RGB values of the clipping edge only icon may be subtracted from a respective pixel in the alpha channel icon. In another example, the seventh step of the icon conversion process may include creating a first mode final glyph by clipping an alpha value from the dark glyph and adding a constant value to the dark glyph. The first mode final glyph may be displayed within the quick access toolbar portion of the application while maintaining clearness, sharpness, fidelity, and key features of the color icons. In this regard, a user may quickly and easily identify the first mode final glyph within the quick access toolbar that corresponds with the color icon within the ribbon of the application. In turn, a technical effect that may be appreciated is that displaying the final glyphs within the quick access toolbar in a clear, understandable, and accurate manner facilitates a compelling visual and functional experience to allow a user to efficiently interact with the user interface and consume content in applications.

In some aspects, the seventh step of the icon conversion process may include inverting the dark glyph to create a light glyph. In this example, an eighth step of the icon conversation process may include creating a second mode final glyph by clipping an alpha value from the light glyph and adding a constant value to the light glyph. The second mode final glyph may be displayed within the quick access toolbar portion of the application while maintaining clearness, sharpness, fidelity, and key features of the color icons. In this regard, a user may quickly and easily identify the second mode final glyph within the quick access toolbar that corresponds with the color icon within the ribbon of the application. In some examples, the first mode final glyph may be displayed within the quick access toolbar when the application is in a first application mode. In another example, the second mode final glyph may be displayed within the quick access toolbar when the application is in a second application mode.

Referring now to the drawings, in which like numerals represent like elements through the several figures, aspects of the present disclosure and the exemplary operating environment will be described. With reference to FIG. 1, one view 100 of a plurality of icons at various stages while applying a multi-step icon conversion process is illustrated. In one implementation, the multi-step icon conversion process may be implemented on a client computing device (e.g., such as the computing device illustrated in FIG. 4). In a basic configuration, the client computing device is a handheld computer having both input elements and output elements. The client computing device may be any suitable computing device for implementing the multi-step icon conversion process 100 for converting color icons into glyph (e.g., white) icons. For example, the client computing device may be at least one of: a mobile telephone; a smart phone; a tablet; a phablet; a smart watch; a wearable computer; a personal computer; a desktop computer; a laptop computer; a gaming device/computer (e.g., Xbox); a television; and etc. This list is exemplary only and should not be considered as limiting. Any suitable client computing device for implementing the multi-step icon conversion process for converting color icons into glyph (e.g., white) icons may be utilized.

Figure 4:
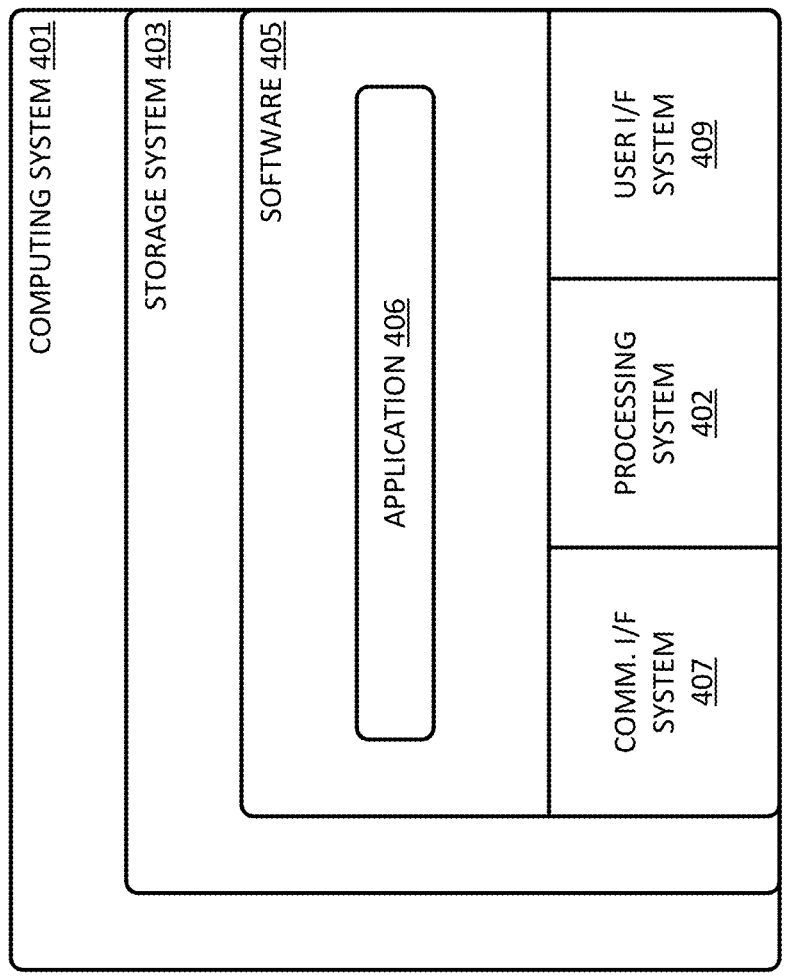
FIG. 4 illustrates a computing system suitable for implementing the enhanced icon edge detection technology disclosed herein, including any of the environments, architectures, elements, processes, user interfaces, and operational scenarios and sequences illustrated in the Figures and discussed below in the Technical Disclosure.

In aspects, the multi-step icon conversion process may be implemented on a server computing device (e.g., such as the computing device illustrated in FIG. 4). The server computing device may provide data to and from a client computing device through a network. In aspects, the multi-step icon conversion process may be implemented on more than one server computing device, such as a plurality of server computing devices. As discussed above, the server computing device may provide data to and from a client computing device through a network. The data may be communicated over any network suitable to transmit data. In some aspects, the network is a distributed computer network such as the Internet. In this regard, the network may include a Local Area Network (LAN), a Wide Area Network (WAN), the Internet, wireless and wired transmission mediums. In this regard, content of an application may be displayed on a user interface of a client computing device.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an Intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which aspects of the disclosure may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

In aspects, the view 100 of a plurality of icons at various stages while applying a multi-step icon conversion process is one example of a view illustrating the various stages of a plurality of icons as the icons are converted from color icons to final glyphs. The view 100 includes a first set of icons 110, a second set of icons 120, a third set of icons 130, a fourth set of icons 140, a fifth set of icons 150, a sixth set of icons 160, a seventh set of icons 170, an eighth set of icons 180, a ninth set of icons 190, and a tenth set of icons 195. The first set of icons 110 includes a plurality of icons 110A-110J. The plurality of icons 110A-110J may include any icon that represents a function, program, and the like. In one example, the plurality of icons 110A-110J are associated with an application. In this regard, in response to receiving a selection of at least one of the plurality of icons 110A-110J, a function associated with the application may be performed. In one case, the application may include any application including content such as documents, images, templates, and the like, such as word processing applications, spreadsheet applications, electronic slide presentation applications, email applications, chat applications, voice applications, and the like.

The first set of icons 110 and/or the plurality of icons 110A-110J may include color icons, as illustrated. In one example, the plurality of icons 110A-110J may be located in a ribbon portion of an application, which will be described in more detail below relative to FIGS. 2A-2B. The first set of icons 110 represent a first stage of color icons in the multi-step icon conversion process for converting color icons into glyphs as described herein. In this regard, upon identifying one or more of the plurality of icons 110A-110J, one or more of the plurality of icons 110A-110J may be converted to corresponding dilated icons (e.g., the second set of icons 120) using a dilation function. For example, the dilation function may generally expand each bright pixel in the color icon into the shape of a kernel, flipped horizontally and vertically. In one example, the dilation function may include dilation of the plurality of icons 110A-110J by a kernel. In one example, the kernel may determine how values of neighboring pixels are used to compute the value of a destination pixel. The kernel may be a packed array. Dilation of the plurality of icons 110A-110J by the kernel may include four steps: (1) for each source pixel of the plurality of icons 110A-110J, placing the kernel over each icon so that the center element of the kernel lies over the source pixel, (2) for each pixel in the kernel, subtracting the value of that pixel from the value of the source pixel underneath it, (3) identifying the minimum values calculated in step 2, and (4) adding the value of the center pixel of the kernel to get the value of the destination pixel.

In response to applying the dilation function to the plurality of icons 110A-110J, the first set of icons 110 are converted to the second set of icons 120. The second set of icons 120 include a plurality of icons 120A-120J. The second set of icons 120 represent a second stage of the color icons in the multi-step icon conversion process for converting color icons into glyphs as described herein. In this regard, the plurality of dilated icons 120A-120J are a dilated representation of the plurality of icons 110A-110J. For example, the dilated icon 120A is the color icon 110A after applying the dilation function to the color icon 110A. In another example, the dilated icon 120J is the color icon 110J after applying the dilation function to the color icon 110J.

In a third step of the multi-step icon conversion process, the first set of icons 110 and the second set of icons 120 may be used to create the third set of icons 130. For example, each icon of the first set of icons 110 may be subtracted from the corresponding icon of the second set of icons 120 to create each icon of the third set of icons 130. In one example, the third set of icons 130 include a plurality of color edge only icons 130A-130J. In this regard, the plurality of color edge only icons 130A-130J are created using the plurality of color icons 110A-110J and the plurality of dilated icons 120A-120J. For example, the color edge only icon 130A may be created by subtracting the color icon 110A from the dilated icon 120A (120A-110A=130A). In one example, subtracting the color icon 110A from the dilated icon 120A includes for each pixel of the color icon 110A subtracting red, green, blue (RGB) values of the color icon 110A from the respective pixel in the dilated icon 120A. As such, each color edge only icon of the plurality of color edge only icons 130A-130J is created by subtracting its corresponding color icon of the plurality of color icons 110A-110J from its corresponding dilated icon of the plurality of dilated icons 120A-120J.

In a fourth step of the multi-step icon conversion process, the third set of icons 130 may be converted into the fourth set of icons 140. For example, an averaging function may be applied to the third set of icons 130 to convert them to the fourth set of icons 140. In one example, the fourth set of icons 140 include a plurality of gray edge only icons 140A-140J. In this regard, the plurality of color edge only icons 130A-130J are converted to the plurality of gray edge only icons 140A-140J by applying an averaging function to the plurality of color edge only icons 130A-130J. In one example, the averaging function may include for each pixel of the plurality of color edge only icons 130A-130J, averaging $RGB-(R+G+B)/3$. In this regard, in one example, the color edge only icon 130A may be converted to the gray edge only icon 140A by averaging $RGB-(R+G+B)/3$ for each pixel of the color edge only icon 130A. As such, each color edge only icon of the plurality of color edge only icons 130A-130J may be converted to its corresponding gray edge only icon of the plurality of gray edge only icons 140A-140J by applying the averaging function to each color edge only icon of the plurality of color edge only icons 130A-130J.

While the plurality of gray edge only icons 140A-140J are created via steps one through four of the multi-step icon conversion process as described herein and illustrated in FIG. 1, it is appreciated that other methods may be used to create the gray edge only icons 140A-140J. For example, any number of edge detection functions may be used to create gray edge only icons from color icons. In one example, an edge detection function may be applied to the plurality of icons 110A-110J to create the gray edge only icons 140A-140J. In one example, the edge detection function may include one or more of convolution, Canny, and Marr-Hildreth functions. In another example, an edge detection function may be applied to the plurality of icons 110A-110J to create the plurality of color edge only icons 130A-130J. In this example, after the edge detection function is applied to the plurality of icons 110A-110J to create the plurality of color edge only icons 130A-130J, the plurality of color edge only icons 130A-130J may be converted to the plurality of gray edge only icons 140A-140J by applying an averaging function to the plurality of color edge only icons 130A-130J (e.g., as described herein relative to the fourth step of the multi-step icon conversion process). In another example, an averaging function may be applied to the plurality of color icons 110A-110J to create a plurality of grayscale edge icons (not illustrated). In this example, an edge detection function may be applied to the plurality of grayscale edge icons to create the plurality of gray edge only icons 140A-140J.

In a fifth step of the multi-step icon conversion process, the first set of icons 110 may be converted into the fifth set of icons 150 using an alpha channel. In one example, the fifth set of icons 150 include a plurality of alpha channel icons 150A-150J. In this regard, the plurality of color icons 110A-110J are converted to the plurality of alpha channel icons 150A-150J using an alpha channel. For example, an alpha value of each pixel of the plurality of color icons 110A-110J may be kept and a RGB value of each pixel of the plurality of color icons 110A-110J may be set to a constant value. In this regard, in one example, the color icon 110A may be converted to the alpha channel icon 150A by keeping the alpha value of each pixel of the color icon 110A and setting the RGB value of each pixel of the color icon 110A to a constant value. In one example, the RGB value of each pixel of the color icon 110A may be set to a constant value of 255. As such, each color icon of the plurality of color icons 110A-110J may be converted to its corresponding alpha channel icon of the plurality of alpha channel icons 150A-150J by using the alpha channel.

In a sixth step of the multi-step icon conversion process, the fourth set of icons 140 and the fifth set of icons 150 may be used to create a sixth set of icons 160. For example, each icon of the fourth set of icons 140 may be subtracted from the corresponding icon of the fifth set of icons 150 to create each icon of the sixth set of icons 160. In one example, the sixth set of icons 160 may include a plurality of dark glyphs 160A-160J. In this regard, the plurality of dark glyphs 160A-160J are created using the plurality of gray edge only icons 140A-140J and the plurality of alpha channel icons 150A-150J. For example, the dark glyph 160A may be created by subtracting the gray edge only icon 140A from the alpha channel icon 150A (150A-140A=160A). In one example, subtracting the gray edge only icon 140A from the alpha channel icon 150A includes, for each pixel of the gray edge only icon 140A, subtracting one or more RGB values of the gray edge only icon 140A from a respective pixel in the alpha channel icon 150A. As such, each dark glyph of the plurality of dark glyphs 160A-160J is created by subtracting its corresponding gray edge only icon of the plurality of gray edge only icons 140A-140J from its corresponding alpha channel icon of the plurality of alpha channel icons 150A-150J.

In a seventh step of the multi-step icon conversion process, the sixth set of icons 160 may be used to create a seventh set of icons 170. For example, each icon of the sixth set of icons 160 may be inverted to create each icon of the seventh set of icons 170. In one example, the seventh set of icons 170 may include a plurality of light glyphs 170A-170J. In this regard, the plurality of light glyphs 170A-170J are created using the plurality of dark glyphs 160A-160J. For example, the light glyph 170A may be created by inverting the dark glyph 160A. In one example, inverting the dark glyph 160A to create the light glyph 170A comprises subtracting an RGB value for each pixel of the dark glyph 160A from 255 (e.g., 255-RGB). As such, each light glyph of the plurality of light glyphs 170A-170J is created by inverting each dark glyph of the plurality of dark glyphs 160A-160J.

In an eighth step of the multi-step icon conversion process, after the fourth step of the multi-step icon conversion process and before the fifth step of the multi-step icon conversion process an intensity of the plurality of gray edge only icons 140A-140J may be reduced to create a plurality of clipping edge only icons (not illustrated). For example, reducing the intensity of the plurality of gray edge only icons 140A-140J may reduce an edge darkness of the plurality of gray edge only icons 140A-140J. In one example, the intensity of the plurality of gray edge only icons 140A-140J may be reduced by, when a red, green, blue (RGB) value of a gray edge only icon of the plurality of gray edge only icons 140A-140J is above a predetermined value, clipping the RGB value of the gray edge only icon that is above the predetermined value to an RGB value of the predetermined value. In one example, the predetermined value is 102. In this regard, in the example illustrated in FIG. 1, an eighth set of icons 180 may be created using the plurality of clipping edge only icons. For example, when creating the eighth set of icons 180 using a plurality of clipping edge only icons, in the sixth step of the multi-step icon conversion process a plurality of dark glyphs (e.g., similar to dark glyphs 160A-160J) are created using the plurality of clipping edge only icons (not illustrated) and the plurality of alpha channel icons 150A-150J. For example, a dark glyph may be created by subtracting a clipping edge only icon from its corresponding alpha channel icon (e.g., 150A). In one example, subtracting the clipping edge only icon from its corresponding alpha channel icon includes, for each pixel of the clipping edge only icon, subtracting one or more RGB values of the clipping edge only icon from a respective pixel in the alpha channel icon. As such, each dark glyph of a plurality of dark glyphs is created by subtracting its corresponding clipping edge only icon of the plurality of clipping edge only icons from its corresponding alpha channel icon of the plurality of alpha channel icons (e.g., 150A-150J).

In another example, when creating the eighth set of icons 180 using a plurality of clipping edge only icons, in the seventh step of the multi-step icon conversion process, the plurality of dark glyphs created using the plurality of clipping edge only icons may be inverted to create the eighth set of icons 180. In this regard, the eighth set of icons 180 include a plurality of light glyphs 180A-180J created using the sixth and seventh step of the multi-step icon conversion process with clipping edge icons created by reducing an intensity of the plurality of gray edge only icons 140A-140J.

In a ninth step of the multi-step icon conversion process, the eighth set of icons 180 may be used to create a ninth set of icons 190. Each icon of the ninth set of icons 190 may be created by clipping an alpha value from each icon of the eighth set of icons 180 and adding a constant value to each icon of the eighth set of icons 180. In one example, the ninth set of icons 190 may include a plurality of final glyphs 190A-190J. In this regard, the plurality of final glyphs 190A-190J may be created by clipping an alpha value from the plurality of light glyphs 180A-180J and adding a constant value to the plurality of light glyphs 180A-180J. For example, the final glyph 190A may be created by clipping an alpha value from the light glyphs 180A and adding a constant value to the light glyphs 180A. As such, each final glyph of the plurality of final glyphs 190A-190J is created by clipping an alpha value from each light glyph of the plurality of light glyphs 180A-180J and adding a constant value to each light glyph of the plurality of light glyphs 180A-180J. In one example, the plurality of final glyphs 190A-190J may be created by clipping one or more alpha values from the plurality of light glyphs 180A-180J and adding a constant value to the plurality of light glyphs 180A-180J. In one case, the one or more alpha values clipped from plurality of light glyphs 180A-180J include alpha values greater than 210. In one example, the one or more alpha values are clipped from plurality of light glyphs 180A-180J to have an alpha value of 210. In some cases, the constant value added to the plurality of light glyphs 180A-180J is 25. The constant value may be added to RGB values of the plurality of light glyphs 180A-180J. In another example, a constant value may be multiplied by the plurality of light glyphs 180A-180J instead of added to the plurality of light glyphs 180A-180J. In some cases, a quadratic function and/or a piecewise function may be applied to the plurality of light glyphs 180A-180J instead of adding a constant value to the plurality of light glyphs 180A-180J.

In some examples, the tenth set of icons 195 may be created using the same steps used to create the ninth set of icons with the addition of a step while creating the plurality of dark glyphs 160A-160J. In one example, the tenth set of icons 195 includes the plurality of final glyphs 195A-195J. For example, a dark glyph may be created by subtracting a clipping edge only icon from its corresponding alpha channel icon (e.g., 150A) and calculating an alpha value of each pixel of the dark glyph. In one example, subtracting the clipping edge only icon from its corresponding alpha channel icon includes, for each pixel of the clipping edge only icon, subtracting one or more RGB values of the clipping edge only icon from a respective pixel in the alpha channel icon. In one example, calculating an alpha value of each pixel of the dark glyph includes subtracting a constant value multiplied by the clipping edge only icon from a corresponding alpha value of the color icon 110A. In one example, the constant value is 4. In this regard, for each pixel, the grayscale representation of the RGB values of the clipping edge only icon multiplied by 4 may be subtracted from the corresponding alpha value of the color icon 110A. As such, each dark glyph of a plurality of dark glyphs is created by subtracting its corresponding clipping edge only icon of the plurality of clipping edge only icons from its corresponding alpha channel icon of the plurality of alpha channel icons (e.g., 150A-150J) and calculating an alpha value of each pixel of the dark glyph. In this regard, the plurality of final glyphs 195A-195J are created using the eighth and ninth steps of the multi-step icon conversion process when the sixth step of the multi-step icon conversion process (e.g., creating the plurality of dark glyphs) includes calculating an alpha value of each pixel of the dark glyph.

Figure 2A:
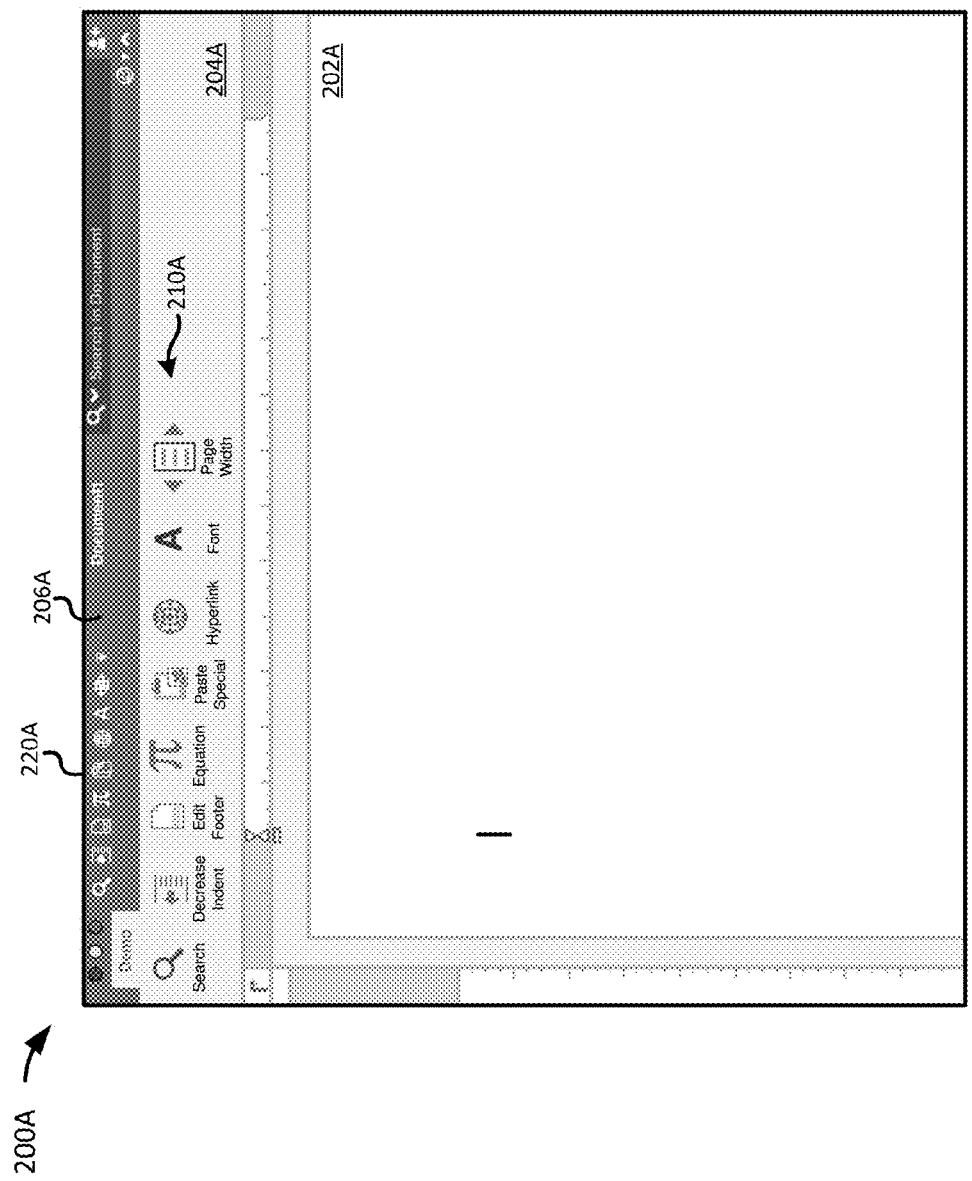
FIG. 2A illustrates a view of a word processing application, according to an example aspect.

Referring now to FIG. 2A, one view of a word processing application 200A is illustrated. While the word processing application 200A is illustrated in FIG. 2A, it is appreciated that any application including content such as documents, images, templates, and the like, such as word processing applications, spreadsheet applications, electronic slide presentation applications, email applications, chat applications, voice applications, and the like may be utilized with the present disclosure. In aspects, the word processing application 200A may be implemented on a client computing device (e.g., such as the computing device illustrated in FIG. 4). In a basic configuration, the client computing device is a handheld computer having both input elements and output elements. The client computing device may be any suitable computing device for implementing the word processing application 200A for converting color icons into glyph (e.g., white) icons. For example, the client computing device may be at least one of: a mobile telephone; a smart phone; a tablet; a phablet; a smart watch; a wearable computer; a personal computer; a desktop computer; a laptop computer; a gaming device/computer (e.g., Xbox); a television; and etc. This list is exemplary only and should not be considered as limiting. Any suitable client computing device for implementing the word processing application 200A for converting color icons into glyph (e.g., white) icons may be utilized.

In aspects, the word processing application 200A may be implemented on a server computing device (e.g., such as the computing device illustrated in FIG. 4). The server computing device may provide data to and from a client computing device through a network. In aspects, the word processing application 200A may be implemented on more than one server computing device, such as a plurality of server computing devices. As discussed above, the server computing device may provide data to and from a client computing device through a network. The data may be communicated over any network suitable to transmit data. In some aspects, the network is a distributed computer network such as the Internet. In this regard, the network may include a Local Area Network (LAN), a Wide Area Network (WAN), the Internet, wireless and wired transmission mediums. In this regard, content of an application may be displayed on a user interface of a client computing device.

In one example, the word processing application 200A may include a file 202A, a ribbon 204A, a quick access toolbar 206A, a plurality of color icons 210A, and a plurality of final glyphs 220A. The various components may be implemented using hardware, software, or a combination of hardware and software. In one example, although FIG. 2A illustrates the word processing application 200A, any application suitable for converting a color icon into a glyph may be utilized in conjunction with the present disclosure. In this regard, an application may include any application suitable for converting a color icon into a glyph such as a word processing application, spreadsheet application, electronic slide presentation application, email application, chat application, voice application, and the like. In one case, a file may include a word document, a spreadsheet, an electronic slide presentation, an email, a chat conversation, and the like. As such, the exemplary application is word processing application 200A. In this example, an exemplary file associated with the word processing application 200A may include the file 202A (e.g., a word document). The file 202A may include the ribbon 204A. The ribbon 204A is a graphical control element within the word processing application 200A that includes a set of functional items in the form of the plurality of color icons 210A. In some examples, the ribbon 204A may be hidden such that a user of the word processing application 200A cannot view the ribbon 204A. In some examples, the ribbon 204A may display the plurality of color icons 210A. The plurality of color icons 210A may include functional icons. For example, in response to receiving a selection of at least one of the plurality of color icons 210A, a function associated with the word processing application 200A may be performed. In examples, the plurality of color icons 210A may be displayed within the ribbon 204A by default.

In some examples, the file 202A may include the quick access toolbar 206A. In some cases, the quick access toolbar 206A may be provided within the word processing application 200A for customization of the plurality of color icons 210A located in the ribbon 204A. For example, a user of the word processing application 200A may customize the quick access toolbar 206A to include the plurality of final glyphs 220A. In this regard, when the multi-step icon conversion process is applied to the plurality of color icons 210A, the plurality of final glyphs 220A may be displayed within the quick access toolbar 206A. As illustrated in FIG. 2A, the plurality of final glyphs 220A are white. In this regard, the plurality of final glyphs 220A may be a representation of the plurality of color icons 210A in white.

In one example, the plurality of final glyphs 220A are smaller in size than the plurality of color icons 210A located in the ribbon 204A. In this regard, the plurality of final glyphs 220A displayed within the quick access toolbar 206A may be scaled to the size of the quick access toolbar 206A. The quick access toolbar 206A may have a quick access toolbar background color and the ribbon 204A may have a ribbon background color. In one example, the quick access toolbar background color may be different from ribbon background color. As illustrated in FIG. 2A, the quick access toolbar background color is blue and the ribbon background color is gray. In order to scale the plurality of color icons 210A and maintain clearness, sharpness, fidelity, and key features of the plurality of color icons 210A when displayed on a different background color (e.g., the blue quick access toolbar background), the plurality of color icons 210A in the ribbon 204A may be converted to the plurality of final glyphs 220A for display within the quick access toolbar 206A while maintaining clearness, sharpness, fidelity, and key features of the plurality of color icons 210A.

In one aspect, the plurality of final glyphs 220A displayed within the quick access toolbar 206A may include first mode final glyphs. In one example, the plurality of final glyphs 220A displayed within the quick access toolbar 206A include first mode final glyphs when the word processing application 200A is in a first application mode. In one case, the first application mode may be a classic mode. In some examples, the first mode final glyphs are created by applying the ninth step of the multi-step icon conversion process described herein to the dark glyphs as described herein. For example, the first mode final glyphs may be created by clipping one or more alpha values from the dark glyphs and adding a constant value to the dark glyphs (e.g., the dark glyphs created during the sixth step of the multi-step icon conversion process including using the clipping edge only icon, as described herein).

In one aspect, the plurality of final glyphs 220A displayed within the quick access toolbar 206A may include second mode final glyphs. In one example, the plurality of final glyphs 220A displayed within the quick access toolbar 206A include second mode final glyphs when the word processing application 200A is in a second application mode. In one case, the second application mode may be a colorful mode. In some examples, the second mode final glyphs are created by applying the ninth step of the multi-step icon conversion process described herein. For example, the second mode final glyphs may be created by clipping one or more alpha values from the light glyphs and adding a constant value to the light glyphs.

In another example, the word processing application 200A may be implemented as a user interface component. In one case, the user interface component may be a touchable user interface that is capable of receiving input via contact with a screen of the client computing device, thereby functioning as both an input device and an output device. For example, content may be displayed, or output, on the screen of the client computing device and input may be received by contacting the screen using a stylus or by direct physical contact of a user, e.g., touching the screen. Contact may include, for instance, tapping the screen, using gestures such as swiping or pinching the screen, sketching on the screen, etc.

In another case, the user interface component may be a non-touch user interface. In one case, a tablet device, for example, may be utilized as a non-touch device when it is docked at a docking station (e.g., the tablet device may include a non-touch user interface). In another case, a desktop computer may include a non-touch user interface. In this example, the non-touchable user interface may be capable of receiving input via contact with a screen of the client computing device, thereby functioning as both an input device and an output device. For example, content may be displayed, or output, on the screen of the client computing device and input may be received by contacting the screen using a cursor, for example. In this regard, contact may include, for example, placing a cursor on the non-touchable user interface using a device such as a mouse.

Figure 2B:
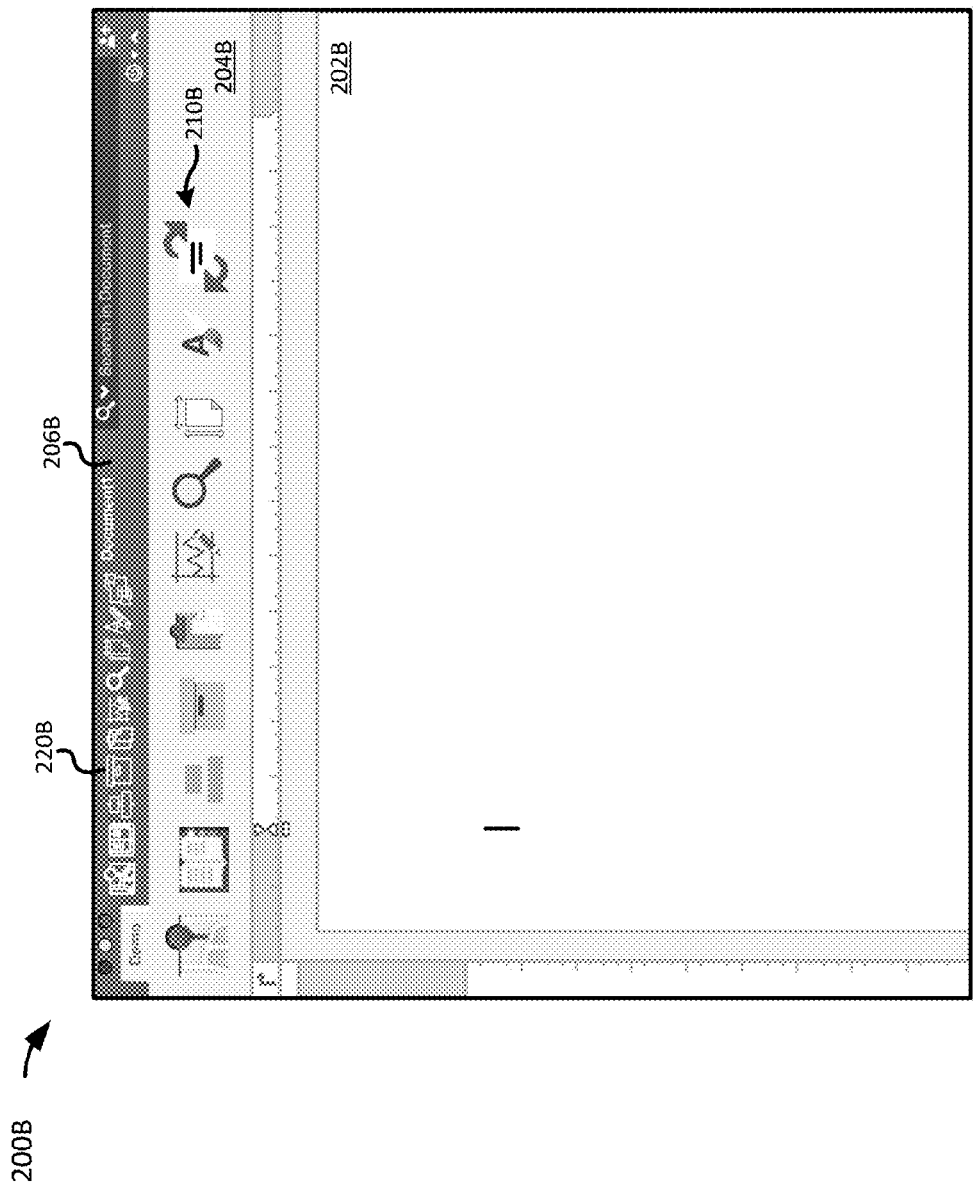
FIG. 2B illustrates another example view of a word processing application, according to an example aspect.

Referring now to FIG. 2B, one view of a word processing application 200B is illustrated. While the word processing application 200B is illustrated in FIG. 2B, it is appreciated that any application including content such as documents, images, templates, and the like, such as word processing applications, spreadsheet applications, electronic slide presentation applications, email applications, chat applications, voice applications, and the like may be utilized with the present disclosure. In aspects, the word processing application 200B may be implemented on a client computing device (e.g., such as the computing device illustrated in FIG. 4). In a basic configuration, the client computing device is a handheld computer having both input elements and output elements. The client computing device may be any suitable computing device for implementing the word processing application 200B for converting color icons into glyph (e.g., white) icons. For example, the client computing device may be at least one of: a mobile telephone; a smart phone; a tablet; a phablet; a smart watch; a wearable computer; a personal computer; a desktop computer; a laptop computer; a gaming device/computer (e.g., Xbox); a television; and etc. This list is exemplary only and should not be considered as limiting. Any suitable client computing device for implementing the word processing application 200A for converting color icons into glyph (e.g., white) icons may be utilized.

In aspects, the word processing application 200B may be implemented on a server computing device (e.g., such as the computing device illustrated in FIG. 4). The server computing device may provide data to and from a client computing device through a network. In aspects, the word processing application 200B may be implemented on more than one server computing device, such as a plurality of server computing devices. As discussed above, the server computing device may provide data to and from a client computing device through a network. The data may be communicated over any network suitable to transmit data. In some aspects, the network is a distributed computer network such as the Internet. In this regard, the network may include a Local Area Network (LAN), a Wide Area Network (WAN), the Internet, wireless and wired transmission mediums. In this regard, content of an application may be displayed on a user interface of a client computing device.

In one example, the word processing application 200B may include a file 202B, a ribbon 204B, a quick access toolbar 206B, a plurality of color icons 210B, and a plurality of final glyphs 220B. The various components may be implemented using hardware, software, or a combination of hardware and software. In one example, although FIG. 2B illustrates the word processing application 200B, any application suitable for converting a color icon into a glyph may be utilized in conjunction with the present disclosure. In this regard, an application may include any application suitable for converting a color icon into a glyph such as a word processing application, spreadsheet application, electronic slide presentation application, email application, chat application, voice application, and the like. In one case, a file may include a word document, a spreadsheet, an electronic slide presentation, an email, a chat conversation, and the like. As such, the exemplary application is word processing application 200B. In this example, an exemplary file associated with the word processing application 200B may include the file 202B (e.g., a word document). The file 202B may include the ribbon 204B. The ribbon 204B is a graphical control element within the word processing application 200B that includes a set of functional items in the form of the plurality of color icons 210B. In some examples, the ribbon 204B may display the plurality of color icons 210B. The plurality of color icons 210B may include functional icons. For example, in response to receiving a selection of at least one of the plurality of color icons 210B, a function associated with the word processing application 200B may be performed. In examples, the plurality of color icons 210B may be displayed within the ribbon 204B by default. In other examples, the plurality of color icons 210B may be displayed within the ribbon 204B by user customization.

In some examples, the file 202B may include the quick access toolbar 206B. In some cases, the quick access toolbar 206B may be provided within the word processing application 200B for customization of the plurality of color icons 210B located in the ribbon 204B. For example, a user of the word processing application 200B may customize the quick access toolbar 206B to include the plurality of final glyphs 220B. In this regard, when the multi-step icon conversion process is applied to the plurality of color icons 210B, the plurality of final glyphs 220B may be displayed within the quick access toolbar 206B. As illustrated in FIG. 2B, the plurality of final glyphs 220B are white. In this regard, the plurality of final glyphs 220B may be a representation of the plurality of color icons 210B in white.

In one example, the plurality of final glyphs 220B are smaller in size than the plurality of color icons 210B located in the ribbon 204B. In this regard, the plurality of final glyphs 220B displayed within the quick access toolbar 206B may be scaled to the size of the quick access toolbar 206B. The quick access toolbar 206B may have a quick access toolbar background color and the ribbon 204B may have a ribbon background color. In one example, the quick access toolbar background color may be different from ribbon background color. As illustrated in FIG. 2B, the quick access toolbar background color is blue and the ribbon background color is gray. In order to scale the plurality of color icons 210B and maintain clearness, sharpness, fidelity, and key features of the plurality of color icons 210B when displayed on a different background color (e.g., the blue quick access toolbar background), the plurality of color icons 210B in the ribbon 204B may be converted to the plurality of final glyphs 220B for display within the quick access toolbar 206B while maintaining clearness, sharpness, fidelity, and key features of the plurality of color icons 210B.

In one aspect, the plurality of final glyphs 220B displayed within the quick access toolbar 206B may include first mode final glyphs. In one example, the plurality of final glyphs 220B displayed within the quick access toolbar 206B include first mode final glyphs when the word processing application 200B is in a first application mode. In one case, the first application mode may be a classic mode. In some examples, the first mode final glyphs are created by applying the ninth step of the multi-step icon conversion process described herein to the dark glyphs as described herein. For example, the first mode final glyphs may be created by clipping one or more alpha values from the dark glyphs and adding a constant value to the dark glyphs (e.g., the dark glyphs created during the sixth step of the multi-step icon conversion process including using the clipping edge only icon, as described herein).

In one aspect, the plurality of final glyphs 220B displayed within the quick access toolbar 206B may include second mode final glyphs. In one example, the plurality of final glyphs 220B displayed within the quick access toolbar 206B include second mode final glyphs when the word processing application 200B is in a second application mode. In one case, the second application mode may be a colorful mode. In some examples, the second mode final glyphs are created by applying the ninth step of the multi-step icon conversion process described herein. For example, the second mode final glyphs may be created by clipping one or more alpha values from the light glyphs and adding a constant value to the light glyphs.

It is appreciated that while FIGS. 2A-2B illustrate specific examples for converting color icons into final glyphs, the discussion of the word processing applications 200A and 200B, the plurality of color icons 210A, 210B, the plurality of final glyphs 220A, 220B, the ribbons 204A, 204B, and the quick access toolbars 206A, 206B is exemplary only and should not be considered as limiting. Any suitable number and/or type of applications, color icons, final glyphs, ribbons, and quick access toolbars may be utilized in conjunction with the present disclosure.

Figure 3:
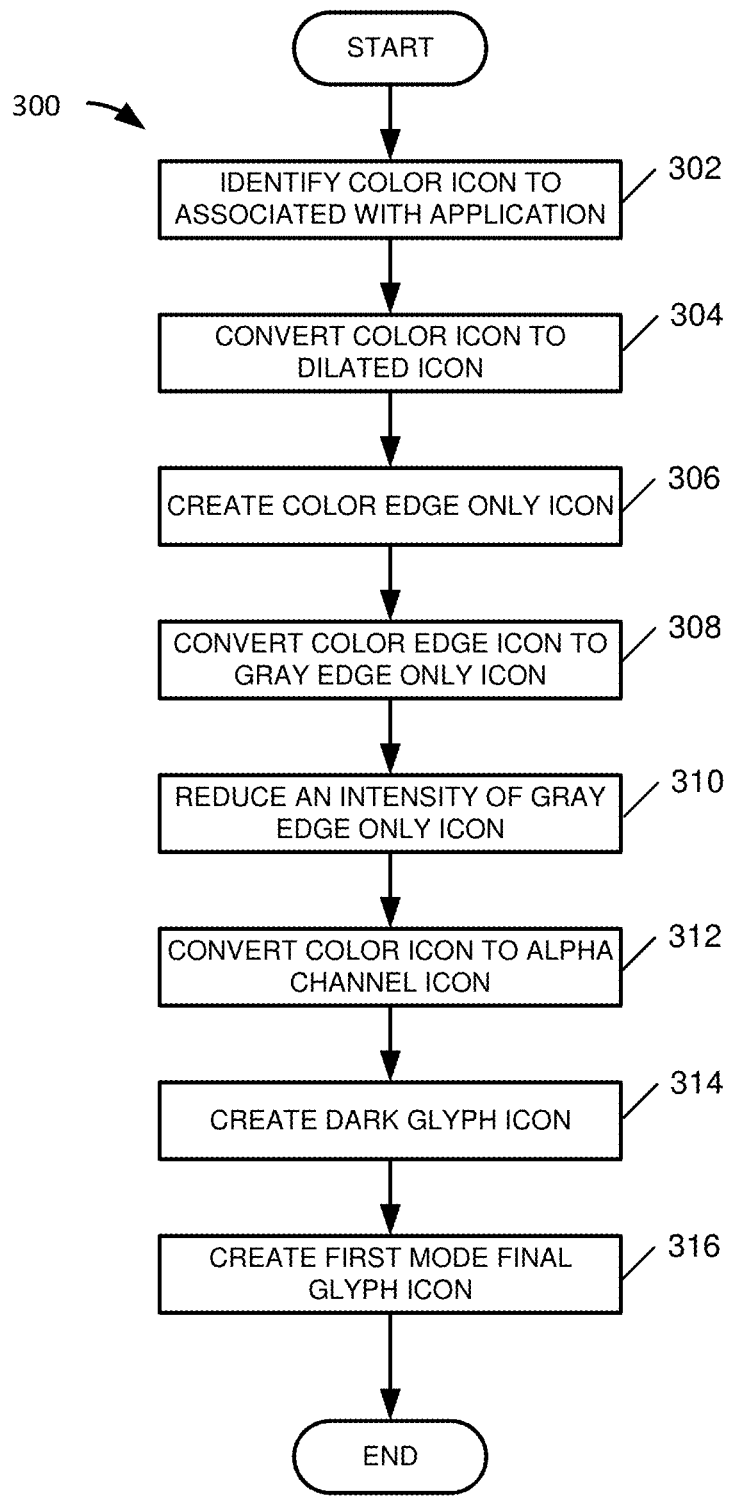
FIG. 3 illustrates an exemplary method for icon edge detection, according to an example aspect.

Referring now to FIG. 3, an exemplary method 300 for icon edge detection, according to an example aspect is shown. Method 300 may be implemented on a computing device or a similar electronic device capable of executing instructions through at least one processor. The corrected content may be displayed by any suitable software application. For example, the software application may be one of an email application, a social networking application, project management application, a collaboration application, an enterprise management application, a messaging application, a word processing application, a spreadsheet application, a database application, a presentation application, a contacts application, a calendaring application, etc. This list is exemplary only and should not be considered as limiting. Any suitable application for displaying the corrected content may be utilized by method 300.

Method 300 may begin at operation 302, where a color icon associated with an application is identified. For example, a color icon located in a ribbon portion of the application may be identified for displaying within a quick access toolbar of the application. The color icon may include any icon that represents a function, program, and the like. In this regard, in response to receiving a selection of the color icon, a function associated with the application may be performed. In one case, the application may include any application including content such as documents, images, templates, and the like, such as word processing applications, spreadsheet applications, electronic slide presentation applications, email applications, chat applications, voice applications, and the like.

When a color icon associated with the application is identified, flow proceeds to operation 304 where the color icon is converted to a dilated icon using a dilation function. For example, the dilation function may generally expand each bright pixel in the color icon into the shape of a kernel, flipped horizontally and vertically. In one example, the dilation function may include dilation of the color icon by a kernel. In one example, the kernel may determine how values of neighboring pixels are used to compute the value of a destination pixel. The kernel may be a packed array. Dilation of the color icon by the kernel may include four steps: (1) for each source pixel of the color icon, placing the kernel over each icon so that the center element of the kernel lies over the source pixel, (2) for each pixel in the kernel, subtracting the value of that pixel from the value of the source pixel underneath it, (3) identifying the minimum values calculated in step 2, and (4) adding the value of the center pixel of the kernel to get the value of the destination pixel.

When the color icon is converted to a dilated icon using a dilation function, flow proceeds to operation 306 where a color edge only icon is created using the color icon and the dilated icon. For example, the color icon may be subtracted from the dilated icon to create the color edge only icon. In one example, subtracting the color icon from the dilated icon includes for each pixel of the color icon subtracting red, green, blue (RGB) values of the color icon from the respective pixel in the dilated icon.

When the color edge only icon is created using the color icon and the dilated icon, flow proceeds to operation 308 where the color edge only icon is converted to a gray edge only icon. In one example, an averaging function may be applied to the color edge only icon to convert the color edge only icon to the gray edge only icon. In one example, the averaging function may include for each pixel of the color edge only icon, averaging RGB−(R+G+B)/3. In this regard, in one example, the color edge only icon may be converted to the gray edge only icon by averaging RGB−(R+G+B)/3 for each pixel of the color edge only icon.

When the color edge only icon is converted to a gray edge only icon, flow proceeds to operation 310 where an intensity of the gray edge only icon is reduced to create a clipping edge only icon. For example, reducing the intensity of the gray edge only icon may reduce an edge darkness of the gray edge only icon. In one example, the intensity of the gray edge only icon is reduced by, when a red, green, blue (RGB) value of the gray edge only icon is above 102, clipping the RGB value of the gray edge only icon that is above 102 to an RGB value of 102.

When an intensity of the gray edge only icon is reduced to create a clipping edge only icon, flow proceeds to operation 312 where the color icon is converted to an alpha channel icon using an alpha channel. For example, an alpha value of each pixel of the color icon may be kept and a RGB value of each pixel of the color icon may be set to a constant value. In this regard, in one example, the color icon may be converted to the alpha channel icon by keeping the alpha value of each pixel of the color icon and setting the RGB value of each pixel of the color icon to a constant value.

When the color icon is converted to an alpha channel icon using an alpha channel, flow proceeds to operation 314 where a dark glyph is created using the clipping edge only icon and the alpha channel icon. For example, the dark glyph may be created by subtracting the gray edge only icon from the alpha channel icon. In one example, subtracting the gray edge only icon from the alpha channel icon includes, for each pixel of the clipping edge only icon, subtracting one or more RGB values of the clipping edge icon from a respective pixel in the alpha channel icon.

When a dark glyph is created using the clipping edge only icon and the alpha channel icon, flow proceeds to operation 316 where a first mode final glyph is created by clipping an alpha value from the dark glyph and adding a constant value to the dark glyph. In one case, the alpha value clipped from the dark glyph may include alpha values greater than 210. In one example, the alpha value clipped from the dark glyph may include alpha values greater than 180. In one example, one or more alpha values are clipped from the dark glyph. In one example, the one or more alpha values are clipped from the dark glyph to have an alpha value of 210. In one example, the one or more alpha values are clipped from the dark glyph to have an alpha value of 180. In some cases, the constant value added to the dark glyph is 25. The constant value may be added to RGB values of the dark glyph. In some examples, the first mode final glyph may be displayed within the application in a user interface when in a first application mode. In examples, the first application mode is a classic mode.

FIG. 4 illustrates computing system 401 that is representative of any system or collection of systems in which the various applications, services, scenarios, and processes disclosed herein may be implemented. Examples of computing system 401 include, but are not limited to, server computers, rack servers, web servers, cloud computing platforms, and data center equipment, as well as any other type of physical or virtual server machine, container, and any variation or combination thereof. Other examples may include smart phones, laptop computers, tablet computers, desktop computers, hybrid computers, gaming machines, virtual reality devices, smart televisions, smart watches and other wearable devices, as well as any variation or combination thereof.

Computing system 401 may be implemented as a single apparatus, system, or device or may be implemented in a distributed manner as multiple apparatuses, systems, or devices. Computing system 401 includes, but is not limited to, processing system 402, storage system 403, software 405, communication interface system 407, and user interface system 409. Processing system 402 is operatively coupled with storage system 403, communication interface system 407, and user interface system 409.

Processing system 402 loads and executes software 405 from storage system 403. Software 405 includes application 406, which is representative of the applications discussed with respect to the preceding FIGS. 1-3, including word processing applications described herein. When executed by processing system 402 to enhance icon edge detection, software 405 directs processing system 402 to operate as described herein for at least the various processes, operational scenarios, and sequences discussed in the foregoing implementations. Computing system 401 may optionally include additional devices, features, or functionality not discussed for purposes of brevity.

Referring still to FIG. 4, processing system 402 may comprise a micro-processor and other circuitry that retrieves and executes software 405 from storage system 403. Processing system 402 may be implemented within a single processing device, but may also be distributed across multiple processing devices or sub-systems that cooperate in executing program instructions. Examples of processing system 402 include general purpose central processing units, application specific processors, and logic devices, as well as any other type of processing device, combinations, or variations thereof.

Storage system 403 may comprise any computer readable storage media readable by processing system 402 and capable of storing software 405. Storage system 403 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 403 may also include computer readable communication media over which at least some of software 405 may be communicated internally or externally. Storage system 403 may be implemented as a single storage device, but may also be implemented across multiple storage devices or sub-systems co-located or distributed relative to each other. Storage system 403 may comprise additional elements, such as a controller, capable of communicating with processing system 402 or possibly other systems.

Software 405 may be implemented in program instructions and among other functions may, when executed by processing system 402, direct processing system 402 to operate as described with respect to the various operational scenarios, sequences, and processes illustrated herein. For example, software 405 may include program instructions for implementing enhanced icon edge detection/conversion technology.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multithreaded, or in accordance with any other suitable execution paradigm, variation, or combination thereof. Software 405 may include additional processes, programs, or components, such as operating system software, virtual machine software, or other application software, in addition to or that include application 406. Software 405 may also comprise firmware or some other form of machine-readable processing instructions executable by processing system 402.

In general, software 405 may, when loaded into processing system 402 and executed, transform a suitable apparatus, system, or device (of which computing system 401 is representative) overall from a general-purpose computing system into a special-purpose computing system customized to facilitate enhanced icon edge detection/conversion. Indeed, encoding software 405 on storage system 403 may transform the physical structure of storage system 403. The specific transformation of the physical structure may depend on various factors in different implementations of this description. Examples of such factors may include, but are not limited to, the technology used to implement the storage media of storage system 403 and whether the computer-storage media are characterized as primary or secondary storage, as well as other factors.

For example, if the computer readable storage media are implemented as semiconductor-based memory, software 405 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 407 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 409 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 409. In some cases, the input and output devices may be combined in a single device, such as a display capable of displaying images and receiving touch gestures. The aforementioned user input and output devices are well known in the art and need not be discussed at length here.

User interface system 409 may also include associated user interface software executable by processing system 402 in support of the various user input and output devices discussed above. Separately or in conjunction with each other and other hardware and software elements, the user interface software and user interface devices may support a graphical user interface, a natural user interface, or any other type of user interface.

Communication between computing system 401 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

Among other examples, the present disclosure presents systems comprising: one or more computer readable storage media; and program instructions stored on the one or more computer readable storage media that, when executed by at least one processor, cause the at least one processor to at least: identify a color icon associated with an application; convert the color icon to a dilated icon using a dilation function; create a color edge only icon using the color icon and the dilated icon; convert the color edge only icon to a gray edge only icon; reduce an intensity of the gray edge only icon to create a clipping edge only icon; convert the color icon to an alpha channel icon using an alpha channel; create a dark glyph using the clipping edge only icon and the alpha channel icon; invert the dark glyph to create a light glyph; and create a final glyph by clipping one or more alpha values from the light glyph and adding a constant value to the light glyph. In further examples, the program instructions, when executed by the at least one processor, further cause the at least one processor to further display the final glyph within the application in a user interface. In further examples, the final glyph is displayed in a quick access toolbar portion of the application. In further examples, the color icon is displayed in a ribbon portion of the application. In further examples, to create the color edge only icon the program instructions, when executed by the at least one processor, further cause the at least one processor to subtract the color icon from the dilated icon. In further examples, to convert the color edge only icon to a gray edge only icon the program instructions, when executed by the at least one processor, further cause the at least one processor to apply an averaging function to the color edge only icon. In further examples, to reduce an intensity of the gray edge only icon to create a clipping edge only icon the program instructions, when executed by the at least one processor, further cause the at least one processor to when a red, green, blue (RGB) value of the gray edge only icon is above a predetermined value, clip the RGB value of the gray edge only icon that is above the predetermined value to an RGB value of the predetermined value. In further examples, to create a dark glyph using the clipping edge only icon and the alpha channel icon the program instructions, when executed by the at least one processor, further cause the at least one processor to: subtract one or more RGB values of the clipping edge only icon from one or more RGB values of a respective pixel in the alpha channel icon; and calculate an alpha value of each pixel of the dark glyph. In further examples, to calculate the alpha value of each pixel of the dark glyph, the program instructions, when executed by the at least one processor, further cause the at least one processor to subtract a constant value multiplied by the clipping edge only icon from a corresponding alpha value of the color icon. In further examples, the final glyph is smaller in size than the color icon.

Further aspects disclosed herein provide an exemplary computer-implemented method for icon edge detection, the method comprising: identifying a color icon associated with an application; converting the color icon to a dilated icon using a dilation function; creating a color edge only icon using the color icon and the dilated icon; converting the color edge only icon to a gray edge only icon; reducing an intensity of the gray edge only icon to create a clipping edge only icon; converting the color icon to an alpha channel icon using an alpha channel; creating a dark glyph using the clipping edge only icon and the alpha channel icon; and creating a first mode final glyph by clipping an alpha value from the dark glyph and adding a constant value to the dark glyph. In further examples, the computer-implemented method further comprises inverting the dark glyph to create a light glyph; and creating a second mode final glyph by clipping an alpha value from the light glyph and adding a constant value to the light glyph. In further examples, inverting the dark glyph to create a light glyph comprises subtracting an RGB value for each pixel of the dark glyph from 255. In further examples, the computer-implemented method further comprises displaying the first mode final glyph within the application in a user interface when in a first application mode. In further examples, the computer-implemented method further comprises displaying the second mode final glyph within the application in a user interface when in a second application mode. In further examples, the first application mode is a classic mode. In further examples, the second application mode is a colorful mode.

Additional aspects disclosed herein provide exemplary computing apparatus comprising one or more computer readable storage media; and an application embodied at least in part in program instructions stored on the one or more computer readable storage media and comprising: a file in a user interface for displaying a plurality of color icons and a plurality of final glyphs; a ribbon within the file in the user interface through which to display the plurality of color icons; and a quick access toolbar within the file in the user interface through which to, in response to converting the plurality of color icons into the plurality of final glyphs, display the plurality of final glyphs. In further examples, the ribbon has a ribbon background color and the quick access toolbar has a quick access toolbar background color, and wherein the ribbon background color is different from the quick access toolbar background color. In further examples, converting the plurality of color icons into the plurality of final glyphs comprises for each color icon of the plurality of color icons: creating a gray edge only icon by applying an edge detection function to the color icon; reducing an intensity of the gray edge only icon to create a clipping edge only icon; converting the color icon to an alpha channel icon using an alpha channel; creating a dark glyph using the clipping edge only icon and the alpha channel icon; and creating a final glyph by clipping an alpha value from the dark glyph and adding a constant value to the dark glyph.

Techniques for providing icon edge detection for converting color icons into final glyphs are described. Although aspects are described in language specific to structural features and/or methodological acts, it is to be understood that the aspects defined in the appended claims are not necessarily limited to the specific features or acts described above. Rather, the specific features and acts are disclosed as example forms of implementing the claimed aspects.

A number of methods may be implemented to perform the techniques discussed herein. Aspects of the methods may be implemented in hardware, firmware, or software, or a combination thereof. The methods are shown as a set of blocks that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods may be implemented via interaction between various entities discussed above with reference to the touchable user interface.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an aspect with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

Additionally, while the aspects may be described in the general context of icon edge detection systems that execute in conjunction with an application program that runs on an operating system on a computing device, those skilled in the art will recognize that aspects may also be implemented in combination with other program modules. In further aspects, the aspects disclosed herein may be implemented in hardware.

Generally, program modules include routines, programs, components, data structures, and other types of structures that perform particular tasks or implement particular abstract data types. Moreover, those skilled in the art will appreciate that aspects may be practiced with other computer system configurations, including hand-held devices, multiprocessor systems, microprocessor-based or programmable consumer electronics, minicomputers, mainframe computers, and comparable computing devices. Aspects may also be practiced in distributed computing environments where tasks are performed by remote processing devices that are linked through a communications network. In a distributed computing environment, program modules may be located in both local and remote memory storage devices.

Aspects may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or compact servers, an application executed on a single computing device, and comparable systems.

What is claimed is:

1. A system comprising:
   one or more non-transitory computer readable storage media; and
   program instructions stored on the one or more non-transitory computer readable storage media that, when executed by at least one processor, cause the at least one processor to at least:
   identify a color icon associated with an application, where the color icon is in a first portion of the application, and where the color icon is a first size corresponding to the first portion of the application;
   scale the color icon to a first final glyph having a first level of precision corresponding to the color icon by executing a first icon conversion process, where the first final glyph is a second size, and where the first icon conversion process includes at least:
   applying a dilation function to the color icon to convert the color icon to a dilated icon;
   creating a color edge only icon using the color icon and the dilated icon;
   converting the color edge only icon to a gray edge only icon;
   reducing an intensity of the gray edge only icon to create a clipping edge only icon;
   converting the color icon to an alpha channel icon using an alpha channel;
   creating a first dark glyph by subtracting the clipping edge only icon from the alpha channel icon;
   inverting the first dark glyph to create a first light glyph; and
   creating the first final glyph by clipping one or more alpha values from the first light glyph and adding a constant value to the first light glyph, where the first final glyph is in a second portion of the application; and
   scale the color icon to a second final glyph having a second level of precision corresponding to the color icon by executing a second icon conversion process, where the second icon conversion process includes at least:
   creating a second dark glyph by subtracting the gray edge only icon from the alpha channel icon; and
   creating the second final glyph by inverting the second dark glyph to a second light glyph.

2. The system of claim 1, wherein the program instructions, when executed by the at least one processor, further cause the at least one processor to further display the first final glyph and the second final glyph within the application in a user interface.

3. The system of claim 2, wherein the first final glyph and the second final glyph are displayed in a quick access toolbar portion of the application.

4. The system of claim 1, wherein the color icon is displayed in a ribbon portion of the application.

5. The system of claim 1, wherein to create the color edge only icon the program instructions, when executed by the at least one processor, further cause the at least one processor to subtract the color icon from the dilated icon.

6. The system of claim 1, wherein to convert the color edge only icon to a gray edge only icon the program instructions, when executed by the at least one processor, further cause the at least one processor to apply an averaging function to the color edge only icon.

7. The system of claim 1, wherein to reduce an intensity of the gray edge only icon to create a clipping edge only icon the program instructions, when executed by the at least one processor, further cause the at least one processor to when a red, green, blue (RGB) value of the gray edge only icon is above a predetermined value, clip the RGB value of the gray edge only icon that is above the predetermined value to an RGB value of the predetermined value.

8. The system of claim 1, wherein to create the first dark glyph by subtracting the clipping edge only icon from the alpha channel icon the program instructions, when executed by the at least one processor, further cause the at least one processor to:

subtract one or more RGB values of the clipping edge only icon from one or more RGB values of a respective pixel in the alpha channel icon; and calculate an alpha value of each pixel of the first dark glyph.

9. The system of claim 8, wherein to calculate the alpha value of each pixel of the first dark glyph, the program instructions, when executed by the at least one processor, further cause the at least one processor to subtract a constant value multiplied by the clipping edge only icon from a corresponding alpha value of the color icon.

10. The system of claim 1, wherein the first final glyph and the second final glyph are smaller in size than the color icon.

11. A computer-implemented method for icon edge detection, the method comprising:
identifying a color icon associated with an application;
scaling the color icon to a first final glyph having a first level of precision corresponding to the color icon by executing a first icon conversion process, where the first icon conversion process includes at least:
applying a dilation function to the color icon to convert the color icon to a dilated icon;
creating a color edge only icon using the color icon and the dilated icon;
converting the color edge only icon to a gray edge only icon;
reducing an intensity of the gray edge only icon to create a clipping edge only icon;
converting the color icon to an alpha channel icon using an alpha channel;
creating a dark glyph by subtracting the clipping edge only icon from the alpha channel icon;
creating the first final glyph by clipping an alpha value from the dark glyph and adding a constant value to the dark glyph; and
scaling the color icon to a second final glyph having a second level of precision corresponding to the color icon by executing a second icon conversion process, where the second icon conversion process includes at least:
inverting the dark glyph to create a light glyph; and
creating a second final glyph by clipping an alpha value from the light glyph and adding a constant value to the light glyph.

12. The computer-implemented method of claim 11, wherein inverting the dark glyph to create a light glyph comprises subtracting an RGB value for each pixel of the dark glyph from 255.

13. The computer-implemented method of claim 11, further comprising displaying the first final glyph within the application in a user interface when in a first application mode.

14. The computer-implemented method of claim 11, further comprising displaying the second final glyph within the application in a user interface when in a second application mode.

15. The computer-implemented method of claim 11, where the color icon is in a first portion of the application, and where the color icon is a first size corresponding to the first portion of the application.

16. The computer-implemented method of claim 11, where the first final glyph is in a second portion of the application, and where the first final glyph is scaled to a second size corresponding to the second portion of the application.

17. The computer-implemented method of claim 16, where the second final glyph is in the second portion of the application, and where the second final glyph is scaled to the second size corresponding to the second portion of the application.

18. A computing apparatus comprising:
one or more non-transitory computer readable storage media; and
an application embodied at least in part in program instructions stored on the one or more non-transitory computer readable storage media and comprising:
a file in a user interface for displaying a plurality of color icons and a plurality of final glyphs;
a ribbon within the file in the user interface through which to display the plurality of color icons; and
a quick access toolbar within the file in the user interface through which to, in response to converting the plurality of color icons into the plurality of final glyphs, display the plurality of final glyphs;
wherein converting the plurality of color icons into the plurality of final glyphs comprises for each color icon of the plurality of color icons scaling the color icon to a first final glyph having a first level of precision corresponding to the color icon by executing a first icon conversion process, where the first icon conversion process includes at least:
applying a dilation function to the color icon to convert the color icon to a dilated icon;
creating a color edge only icon using the color icon and the dilated icon;
converting the color edge only icon to a gray edge only icon;
reducing an intensity of the gray edge only icon to create a clipping edge only icon;
converting the color icon to an alpha channel icon using an alpha channel;
creating a dark glyph by subtracting the clipping edge only icon from the alpha channel icon;
creating the first final glyph by clipping an alpha value from the dark glyph and adding a constant value to the dark glyph; and
scaling the color icon to a second final glyph having a second level of precision corresponding to the color icon by executing a second icon conversion process, where the second icon conversion process includes at least:
inverting the dark glyph to create a light glyph; and
creating a second final glyph by clipping an alpha value from the light glyph and adding a constant value to the light glyph.

19. The computing apparatus of claim 18, wherein the ribbon has a ribbon background color and the quick access toolbar has a quick access toolbar background color, and wherein the ribbon background color is different from the quick access toolbar background color.

20. The computing apparatus of claim 18, wherein the plurality of color icons are a first size corresponding to the ribbon, and wherein the plurality of final glyphs are scaled to a second size corresponding to the quick access toolbar.

* * * * *